United States Patent
Mohamed et al.

(10) Patent No.: US 6,684,319 B1
(45) Date of Patent: Jan. 27, 2004

(54) SYSTEM FOR EFFICIENT OPERATION OF A VERY LONG INSTRUCTION WORD DIGITAL SIGNAL PROCESSOR

(75) Inventors: Moataz A. Mohamed, Irvine, CA (US); Keith M. Bindloss, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 653 days.

(21) Appl. No.: 09/608,233

(22) Filed: Jun. 30, 2000

(51) Int. Cl.$^7$ .............................. G06F 9/00
(52) U.S. Cl. ........................ 712/24; 712/207
(58) Field of Search ................ 712/24, 23, 26, 712/205, 204, 213, 210, 233, 241, 207; 711/100, 137, 213, 221

(56) References Cited

U.S. PATENT DOCUMENTS

| | | | | |
|---|---|---|---|---|
| 4,652,997 A | * | 3/1987 | Kloker | 712/241 |
| 5,081,575 A | * | 1/1992 | Hiller et al. | 710/317 |
| 5,101,484 A | | 3/1992 | Kohn | 395/375 |
| 5,210,827 A | * | 5/1993 | Takahashi et al. | 709/246 |
| 5,226,128 A | * | 7/1993 | Rau et al. | 712/241 |
| 5,507,027 A | | 4/1996 | Kawamoto | 395/375 |
| 5,634,136 A | * | 5/1997 | Ohshima et al. | 712/237 |
| 5,727,194 A | | 3/1998 | Shridhar et al. | 395/588 |
| 5,794,029 A | * | 8/1998 | Babaian et al. | 712/241 |
| 5,889,985 A | * | 3/1999 | Babaian et al. | 712/225 |
| 5,958,048 A | * | 9/1999 | Babaian et al. | 712/241 |

* cited by examiner

Primary Examiner—Henry W. H. Tsai
(74) Attorney, Agent, or Firm—Farjami & Farjami LLP

(57) ABSTRACT

The present invention minimizes power consumption and processing time in a very long instruction word digital signal processor by identifying certain blocks of instructions and placing them in a small, fast buffer for subsequent retrieval and execution. A decoder unit decodes a prefetch instruction flag bit that indicates when instructions are to be prefetched and placed into the buffer. The decoder unit signals a control unit, which sends the instruction code from a memory unit to the buffer and maintains an address mapping table and a program counter. The control unit also sets a select input on a multiplexer to indicate that the multiplexer is to output the prefetch instructions it receives from the buffer. The multiplexer outputs the prefetch instructions to an instruction register that sends the prefetch instructions to appropriate functional units for execution.

26 Claims, 2 Drawing Sheets

SYSTEM FOR EFFICIENT OPERATION OF A VERY LONG INSTRUCTION WORD DIGITAL SIGNAL PROCESSOR

TECHNICAL FIELD OF THE INVENTION

The present invention generally relates to very long instruction word digital signal processors. More particularly, the present invention relates to a prefetch instruction buffer in a very long instruction word digital signal processor.

BACKGROUND OF THE INVENTION

In a very long instruction word digital signal processor, it is important to minimize power consumption and execution time. In a digital signal processor employing a very long instruction word architecture, or another type of architecture, instructions are fetched from storage in memory, whether it be main memory or instruction cache, then routed along instruction buses and placed in instruction registers where the instructions are decoded for execution. Because very long instruction word instruction packets are long (typically 128 or 256 bits) the instruction buses are correspondingly wide to accommodate the size of the instruction packets.

A significant amount of power is consumed in driving these instruction buses. The amount of power consumed in moving a large block of instructions from memory depends in part on the size of the block. For example, less power will be consumed in moving a block of instructions from memory that is 1 kilobyte (kB) as opposed to a block of instructions that is 500 kB. In addition, the time needed to execute instructions is typically much less than the time needed to retrieve instructions from memory.

Instruction caches have been used in digital signal processors for many years to address problems associated with disparate processor and memory speeds. An instruction cache is a smaller amount of memory that runs at a high speed. To speed up the execution of instructions, instructions may be fetched from main memory prior to execution and placed into an instruction cache. When the instructions are needed, they can be retrieved from the instruction cache rather than from main memory, which takes significantly less time and consumes less power. For this reason, an instruction cache may be considered a latency hiding mechanism: the latency associated with fetching particular instructions from main memory at the moment that such instructions are needed is hidden by fetching such instructions from main memory prior to the time they are needed and placing them in a more quickly accessible location.

In a typical application, an instruction cache is implemented as a multi-level storage system. An instruction cache is arranged such that one level is examined or searched at a time, from the lowest level to the highest level, for a particular instruction or set of instructions. The lowest level of instruction cache is generally referred to as L1 or first level cache and is typically the fastest cache and consumes the least power. An L1 cache is typically located closest to the processor. An L1 cache generally is a small memory block and may be about 4 kB or 8 kB in size, although other sizes could be used. If the particular instructions sought are located in the first level cache, the instructions are routed to the instruction register for execution. If the particular instructions are not located in the first level cache, the next (second) level cache is then searched, and so forth, up to the highest level cache and then to main memory. The levels may be arranged in a manner such that higher levels of cache encompass lower levels of cache. As the level of instruction cache increases, so does the size of the cache and the power consumed in searching the cache.

In addition, the time needed to access a higher level cache ("access cycle time") is greater than for accessing a lower level cache. The access cycle time is the time required for a computer to locate, retrieve and route instructions to an instruction register. The access cycle time of a higher level cache is a multiple, but not necessarily an integer multiple, of the access cycle time for a lower level cache. For example, if it "costs" one cycle to access a first level cache, it might cost four cycles to access a second level cache, eight cycles to access a third level cache and so forth. The multiples are a result of many design parameters, some of which include the size of the caches, the speed of the memory, and the components used.

Thus, depending upon where particular instructions are stored, even though an instruction cache helps to minimize the disparity between processing speeds and memory speeds, a significant amount of time and power may be consumed in locating particular instructions.

Moreover, in a digital signal processor, a large percentage of processing time may be spent in executing inner loops, repeat loops, also known as zero-overhead loops, and frequently-called functions. Minimizing the power consumed and processing time expended by such loops and functions is a goal in designing digital signal processors. This goal is especially difficult to achieve when using a very long instruction word architecture because of the length of the instruction packet. Therefore, there is a need for a very long instruction word architecture digital signal processor that uses, stores, fetches, routes, and manipulates very long instructions, while minimizing the power consumed and the processing time expended in performing such functions.

SUMMARY OF THE INVENTION

The present invention overcomes problems in bussing blocks of very long instruction word instructions from a storage in a memory unit to execution in a functional unit by placing such instructions in a small, fast, low power consumptive prefetch instruction buffer. These instructions include repetitive instruction blocks, such as loops, or frequently used functions (e.g., Fast Fourier Transforms). A signal, such as a prefetch instruction flag bit, is generated and indicates that a particular block of instructions is to be retrieved from the prefetch instruction buffer rather than from the instruction cache. The prefetch instruction flag bit is sent to a prefetch instruction buffer control unit which facilitates copying the instructions from a memory unit to the prefetch instruction buffer. The prefetch instruction buffer control unit also sets a select input flag bit on a multiplexer. The multiplexer receives at least two inputs, one from the prefetch instruction buffer and one from instruction cache and is designed to output an input based on the select input flag bit. The select input flag bit instructs the multiplexer to output the input it receives from the prefetch instruction buffer. The instructions are then transmitted to an instruction register where they are decoded and sent to appropriate functional units for execution. Once all the instructions in the particular block of instructions have been executed, the next block of instructions is processed either from the instruction cache or again from the buffer, as directed. Placing blocks of instructions in a small, fast buffer minimizes the time expended and power consumed in fetching long instructions.

BRIEF DESCRIPTION OF THE DRAWINGS

A more complete understanding of the present invention may be derived by referring to the Detailed Description and Claims when considered in connection with the Figures, wherein like reference numbers refer to like items throughout the Figures, and:

DETAILED DESCRIPTION

The present invention is described herein in terms of block components and process steps. It should be appreciated that any number of hardware components may be configured to perform the specified functions of the block components. Those skilled in the art will appreciate that the present invention may be practiced in any number of contexts other than very long instruction word digital signal processors, including other types of data, architectures and microprocessors.

Figure 1:
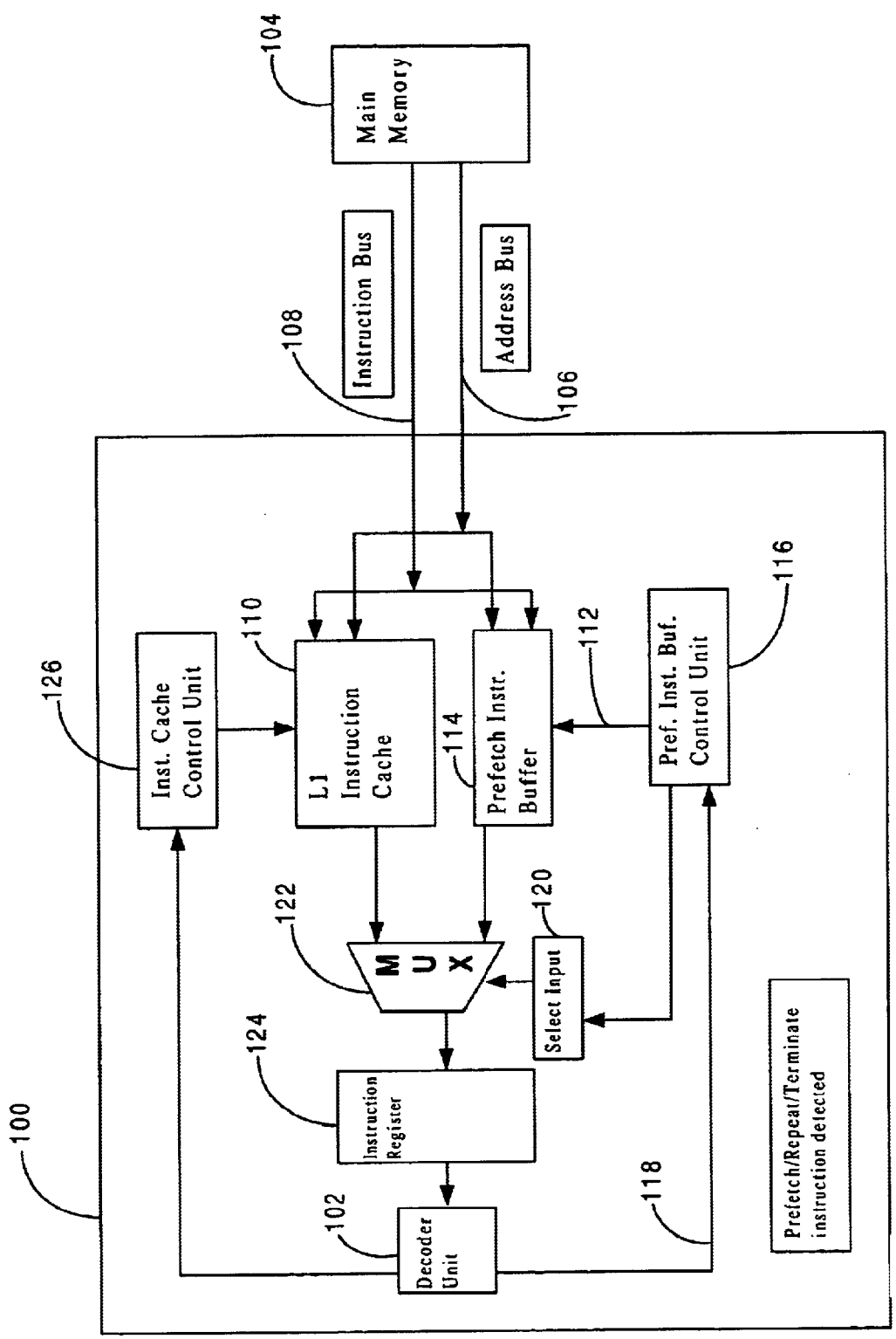
FIG. 1 is a block diagram of an exemplary embodiment of the present invention having a prefetch instruction buffer, a prefetch instruction control unit and a multiplexer.

FIG. 1 is a block diagram of a digital signal processor 100 that shows the flow of instructions and/or other data in accordance with an exemplary embodiment of the present invention. In a typical operation, a decoder unit 102 decodes instructions from a compiler (not shown in FIG. 1) which are to be executed. These instructions are either already located in instruction cache 110 or are fetched from main memory 104; transmitted over instruction bus 108 and address bus 106; and copied into instruction cache 110. Instruction cache control unit 126 maintains information about what is stored in instruction cache 110. From instruction cache 110, the instructions are transmitted to instruction register 124 for decoding and execution.

In accordance with the present invention, initially, a compiler sends to decoder unit 102 a "prefetch instruction" flag bit that indicates that a particular block of instructions, or prefetch instructions, are to be placed into prefetch instruction buffer 114, instead of instruction cache 110. The prefetch instruction flag bit may be one or more bits. The prefetch instructions may be, for example, a loop such as a zero-overhead loop, which is a hardware loop wherein a block of instructions is repeatedly executed a predetermined number of times. The block of instructions may also be a "power-sensitive" function, i.e., a function that is frequently executed in a particular program and thus causes a proportional increase in power consumption. In an exemplary embodiment, the block of instruction code is a plurality of very long instruction word instruction packets, each of which is 128 bits or 256 bits in length. These instruction packets may include smaller instructions, for example, 16-bit or 32-bit instructions. An architecture may be designed such that instruction packets and instructions of different lengths may be used.

Typically, the prefetch instruction flag bit is decoded several instructions before the prefetch instructions are decoded, whether the prefetch instructions are a body of a loop or a power-sensitive function, so that the loop body or the function has been fetched from a memory unit 104 and is accessible for execution without delay.

Figure 2:
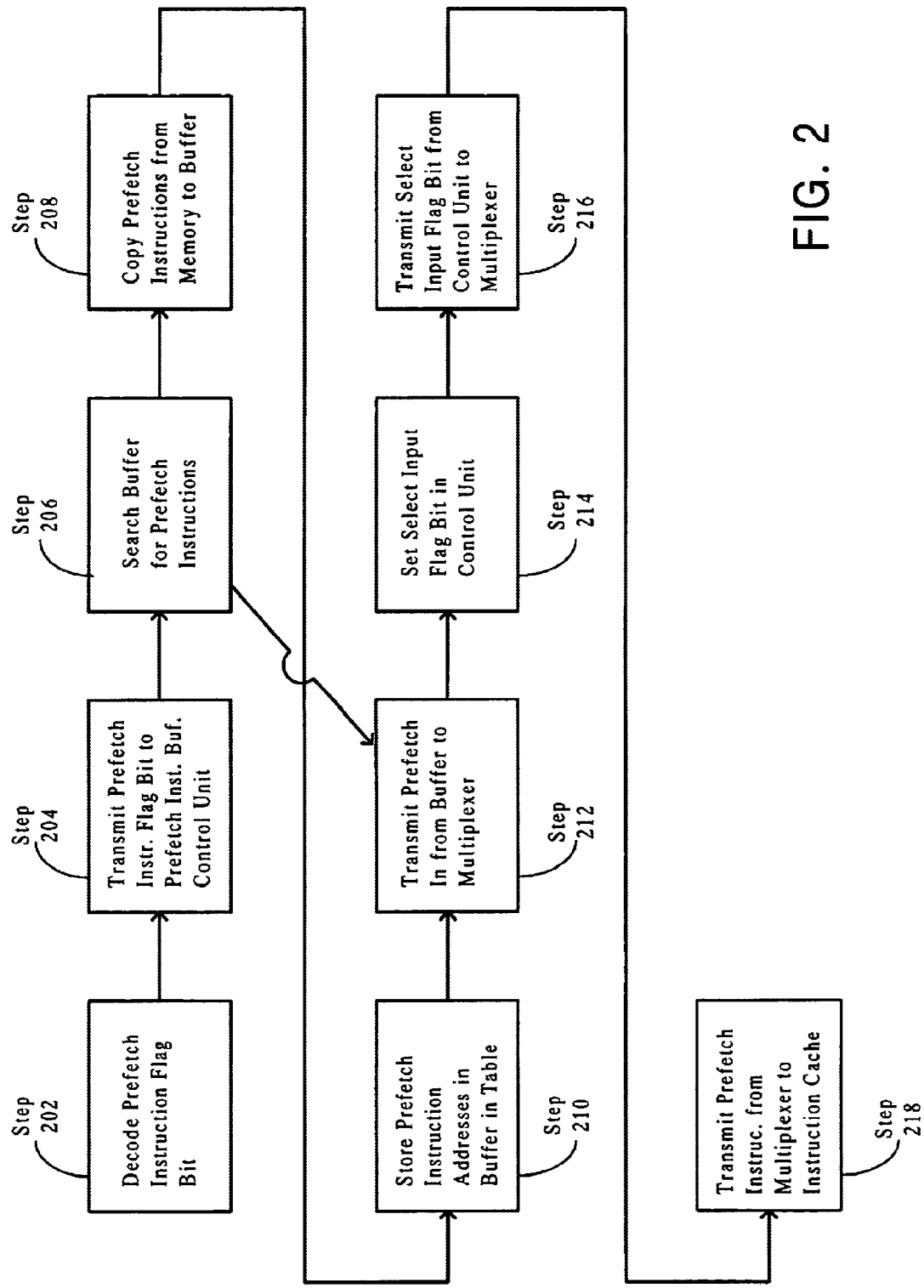
FIG. 2 is a flow chart showing an exemplary method of data flow through the various components in accordance with the present invention.

FIG. 2 is a flow chart showing an exemplary method of data flow through the various components in accordance with the present invention and will be used in conjunction with FIG. 1 to describe the present invention. The prefetch instruction flag bit is decoded by decoder unit 102 located within digital signal processor 100, as shown in step 202. Decoder unit 102 also decodes information such as the size of the prefetch instructions, for example, in terms of number of instruction packets and the location of the prefetch instructions in main memory. Decoder unit 102 then transmits signal 118 to a prefetch instruction buffer control unit 116 indicating that a prefetch instruction flag bit was decoded and that prefetch instructions are to be written to a prefetch instruction buffer 114, as shown in step 204.

Prefetch instruction buffer 114 is a storage component. Prefetch instruction buffer 114 is a separate component from a main memory 104 and an instruction cache 110, and it is typically a small, fast storage component that consumes a small amount of power. Prefetch instruction buffer 114 is typically smaller than the lowest level of instruction cache 110. The size of the buffer is designed to store the number of instructions that would constitute a loop size or a function size. This varies by application, as the loops and functions used will likely be different. In an exemplary embodiment, prefetch instruction buffer 114 is capable of storing 32 very long instruction word instruction packets. If each instruction packet is 128 bits long, the size of prefetch instruction buffer 114 would be 32 * 128 bits or 4096 bits or 512 bytes.

Prefetch instruction buffer control unit 116 maintains information about the contents of prefetch instruction buffer 114 and controls whether the instructions in prefetch instruction buffer 114 are going to be sent to instruction register 124. Upon receiving a prefetch instruction flag bit, prefetch instruction buffer control unit 116 searches prefetch instruction buffer 114 to determine whether the prefetch instructions are already located in prefetch instruction buffer 114, as shown in step 206. In an exemplary embodiment, prefetch instruction buffer control unit 116 searches prefetch instruction buffer 114 using an address mapping table. An address mapping table provides more flexibility in mapping different loops and functions to different places in prefetch instruction buffer 114 without generating conflicting mappings. Conflicting mappings can occur in direct address mapping, that is, mapping an instruction address by a few of its least significant bits, as is typically done in caches.

An exemplary address mapping table is as follows:

| Address in Main Memory | Start Address in Buffer | End Address in Buffer |
| --- | --- | --- |
| 0xCAFE1000 | 0x400 | 0x450 |
| 0xFACE4000 | 0x500 | 0x700 |

The address mapping table, as shown above, contains the address in main memory 104 from which the prefetch instructions are copied, the initial or starting address of such copied prefetch instructions in prefetch instruction buffer 114 and the ending address of such copied prefetch instructions in prefetch instruction buffer 114.

If prefetch instruction buffer control unit 116 locates the prefetch instructions in prefetch instruction buffer 114, the prefetch instructions are transmitted to multiplexer 122 and prefetch instruction buffer control unit 116 sets a select input flag bit 120, as discussed below and as shown in steps 212 and 214.

If prefetch instruction buffer control unit 116 does not locate the prefetch instructions in prefetch instruction buffer 114, prefetch instruction buffer control unit 116 facilitates the copying of prefetch instructions from main memory 104 to prefetch instruction buffer 114. The prefetch instructions are fetched from main memory 104 and copied to prefetch instruction buffer 114 via instruction bus 108 and address bus 106, respectively, as shown in step 208. Prefetch instruction control unit 116 then updates the address mapping table with the various addresses of the prefetch instructions in main memory 104 and prefetch instruction buffer 114, as shown in step 210. In an exemplary embodiment, the prefetch instructions are stored in a read only format in prefetch instruction buffer 114. Upon completion of a loop or function, the prefetch instructions need not be removed from prefetch instruction buffer 114. New instructions may be written over existing instructions that are no longer needed.

Prefetch instruction buffer control unit 116 also maintains a moving program counter to track which instruction packet in the prefetch instructions is currently being copied from prefetch instruction buffer 114 to an instruction register 124. The program counter is initialized to the starting address, i.e., the address in prefetch instruction buffer 114 of the first instruction packet in the block of prefetch instructions when the prefetch instructions are stored in prefetch instruction buffer 114. As each instruction packet is copied to instruction register 124 for execution, the program counter moves or increases by a preset value, typically one, until it equals the ending address, i.e., the address in prefetch instruction buffer 114 of the last instruction packet in the block of prefetch instructions. When the program counter equals the ending address, the last instruction packet in the prefetch instructions will be sent to instruction register 124 for decoding and execution.

Multiplexer 122 is used to output to instruction register 124 any one of a number of different inputs. In an exemplary embodiment, multiplexer 122 receives instructions from at least two inputs, a first input from prefetch instruction buffer 114 and a second input from instruction cache 110, as shown in step 212. Upon receipt of prefetch instruction flag bit, prefetch instruction buffer control unit 116 sets select input flag bit 120 to indicate that instructions are to be obtained from prefetch instruction buffer 114 instead of from instruction cache 110, as shown in step 214. Multiplexer 122 receives select input flag bit 120 from prefetch instruction buffer control unit 116, as shown in step 216, and accordingly outputs the input from prefetch instruction buffer 114, that is, the prefetch instructions, to instruction register 124, as shown in step 218.

Instruction register 124 receives prefetch instructions, one instruction packet at a time, from an output of a multiplexer 122. Instruction register 124 is the final destination of the prefetch instructions prior to decoding and executing by the appropriate functional units.

In accordance with an exemplary embodiment of the present invention, a compiler sends a "repeat" instruction flag bit to decoder unit 102 for decoding. The repeat instruction flag bit, which may be one or more bits, indicates that the prefetch instructions, now the repeat/prefetch instructions, whether they be a loop or a call to a function, should be executed again. In this event, decoder unit 102 sends signal 118 to prefetch instruction buffer control unit 116 to indicate that a repeat instruction flag bit was decoded. Prefetch instruction buffer control unit 116 then searches the address mapping table to determine if the repeat/prefetch instructions are in prefetch instruction buffer 114. If the repeat/prefetch instructions are located in prefetch instruction buffer 114, their location in prefetch instruction buffer 114 is retrieved. Prefetch instruction buffer control unit 116 then sets, or re-sets select input flag bit 120 to indicate that the instructions are to be obtained from prefetch instruction buffer 114. If the repeat/prefetch instructions are not located in prefetch instruction buffer 114, the repeat/prefetch instructions are again fetched from main memory 104 and copied to prefetch instruction buffer 114 as described above. In either case, the program counter in prefetch instruction buffer control unit 116 is set to equal the address in prefetch instruction buffer 114 of the first instruction packet of the repeat/prefetch instructions of the code and the process continues as described above. Each instruction packet of repeat/prefetch instruction is fetched from prefetch instruction buffer 114 is then sent to instruction register 124 via multiplexer 122.

When the prefetch and/or repeat/prefetch instructions have all been sent to instruction register 124 for execution, that is, when all the iterations of a loop have been fully executed or a call to a function is complete, compiler sends decoder unit 102 a terminate flag bit, which may be one or more bits. Decoder unit 102 decodes the terminate flag bit and sends signal 118 to prefetch instruction buffer control unit 116 to indicate that instructions are to no longer be fetched from prefetch instruction buffer 114. Prefetch instruction buffer control unit 116 changes select input flag bit 120 to indicate that multiplexer 122 is to now output instructions received from instruction cache 110, as described in the beginning.

It will be understood that the foregoing description is of exemplary embodiments and methods of this invention and that this invention is not so limited. Various modifications may be made in the design, arrangement, and implementation of these embodiments and methods without departing from the spirit and scope of the present invention, as set forth in the claims below. For example, although the above exemplary embodiments refer to very long instruction word instruction packets in a digital signal processor, the invention may be applied to other types of data or processors in which it is desirable to obtain or process such data while consuming relatively low power and minimizing processing time.

We claim:

1. A very long instruction word processing system, including a memory unit, a decoder unit, and an instruction register, wherein said system minimizes power consumption and processing time, said system comprising:
   a prefetch instruction buffer, wherein said prefetch instruction buffer stores a plurality of prefetch instructions received from the memory unit;
   a prefetch instruction flag bit, wherein said prefetch instruction flag bit is decoded by the decoder unit and said prefetch instruction flag bit indicates that said prefetch instructions are to be placed into said buffer;
   a prefetch instruction control unit, wherein said control unit receives said prefetch instruction flag bit from the decoder unit and wherein said control unit facilitates the placement of said prefetch instructions into said buffer; and
   a multiplexer, wherein said multiplexer receives a select input flag bit and said multiplexer outputs a plurality of instructions to the instruction register based on said select input flag bit.

2. The system of claim 1, wherein said prefetch instruction flag bit is set by a compiler.

3. The system of claim 1, wherein each of said prefetch instructions has a length selected from the group consisting of 128 bits and 256 bits.

4. The system of claim 1, wherein said buffer is configured to store a maximum of 32 prefetch instructions.

5. The system of claim 1, wherein said system further includes an instruction cache and wherein said multiplexer has a first input and a second input, wherein said first input is received from said prefetch instruction buffer and wherein said second input is received from said instruction cache.

6. The system of claim 5, wherein said control unit sets said select input flag bit to a first value indicating that said multiplexer is to output to the instruction register said first input.

7. The system of claim 5, wherein said control unit sets said select input flag bit to a second value indicating that said multiplexer is to output to the instruction register said second input.

8. The system of claim 5, wherein said instruction cache is multi-tiered into levels ranging from low to high and said buffer is smaller than the lowest level cache in size.

9. The system of claim 5, further comprising a terminate instruction, wherein said terminate instruction is decoded by the decoder unit, wherein said control unit receives said terminate instruction and sets said select input flag bit to a value indicating that said multiplexer is to output to the instruction register input received from the instruction cache.

10. The system of claim 1, further comprising an address mapping table, wherein said address mapping table includes an address in the memory unit of said prefetch instructions, a starting address in said buffer of said prefetch instructions, and an ending address in said buffer of said prefetch instructions, wherein said address mapping table is maintained by said control unit.

11. The system of claim 10, wherein said control unit comprises a movable program counter, wherein said movable program counter is initialized to said starting address and is incremented at a preset value until said movable program counter equals said ending address.

12. The system of claim 10, further including a repeat instruction, wherein said repeat instruction is decoded by the decoder unit and wherein said repeat instruction indicates that said prefetch instructions are to be placed into said prefetch instruction buffer.

13. The system of claim 10, wherein said control unit receives a repeat instruction, searches said address mapping table to determine if said prefetch instructions are in said buffer, locates said prefetch instructions in said buffer, re-initializes a movable program counter to said starting address, and sets said select input flag bit to a value indicating that said multiplexer is to output to the instruction register said prefetch instructions received from said buffer.

14. A very long instruction word digital signal processor including a memory unit, a decoder unit, an instruction cache, and instruction register, wherein said processor minimizes power consumption and processing time, said processor comprising:
 a prefetch instruction buffer configured to contain a plurality of prefetch instructions received from the memory unit;
 a prefetch instruction control unit, wherein said control unit receives a prefetch instruction flag bit from the decoder unit which indicates that said prefetch instructions are to be placed into said prefetch instruction buffer and wherein said control unit facilitates the placement of said prefetch instructions into said prefetch instruction buffer; and
 a multiplexer, including a first input, a second input, a select input flag bit, and an output, wherein said first input is received from said prefetch instruction buffer, said second input is received from said instruction cache, said select input flag bit is set by said control unit and said output is transmitted to the instruction register based on said select input flag bit.

15. The processor of claim 14, wherein the instruction cache is multi-tiered into levels ranging from low to high and said buffer is smaller than the lowest level cache.

16. The processor of claim 14, wherein said control unit maintains an address mapping table, said address mapping table including an address in the memory unit of said prefetch instructions, a starting address in said buffer of said prefetch instructions, and an ending address in said buffer of said prefetch instructions.

17. The processor of claim 16, wherein said control unit maintains a movable program counter, wherein said movable program counter is initialized to said starting address and is incremented by a preset amount until said movable program counter equals said ending address.

18. A method for efficiently retrieving instructions in a digital processor, including a memory unit, a decoder unit, and instruction register, said method comprising the steps of:
 decoding a prefetch instruction flag bit indicating that a plurality of prefetch instructions is to be placed into a prefetch instruction buffer;
 transmitting to a prefetch instruction control unit said prefetch instruction flag bit;
 searching said prefetch instruction buffer for said prefetch instructions;
 transmitting to a multiplexer a first input of said prefetch instructions from said prefetch instruction buffer;
 setting a select input flag bit in said control unit;
 transmitting to said multiplexer said select input flag bit; and
 transmitting an output from said multiplexer to the instruction register based on said select input flag bit.

19. The method of claim 18, further comprising the steps of:
 copying said prefetch instructions from the memory unit to said prefetch instruction buffer; and
 storing in an address mapping table an address in the memory unit of said prefetch instructions, a starting address in said buffer of said prefetch instructions, and an ending address in said buffer of said prefetch instructions, wherein said address mapping table is maintained by said control unit.

20. The method of claim 18, wherein said prefetch instructions have a length selected from the group consisting of 128 bits and 256 bits.

21. The method of claim 18, wherein said buffer is configured to store a maximum of 32 prefetch instructions.

22. The method of claim 18, wherein the processor further includes an instruction cache, said method further comprising the steps of:
 decoding a terminate flag bit in the decoder unit;
 transmitting a signal to said control unit said signal indicating that said terminate flag bit has been decoded;
 transmitting to said multiplexer a second input from the instruction cache; and
 setting said select input flag bit to a second value indicating that said output is to equal said second input.

23. The method of claim 18, wherein the processor further includes an instruction cache, wherein the instruction cache is multi-tiered into levels ranging from low to high and wherein said prefetch instruction buffer is smaller than the lowest level cache in size.

24. The method of claim 18, wherein said control unit maintains a program counter which is initialized to a starting address of said prefetch instructions in said buffer and is incremented by a preset amount until said counter equals an ending address of said prefetch instructions in said buffer.

25. The method of claim 24, further comprising the step of setting said select input flag bit to a first value indicating that said output is to equal said first input.

26. The method of claim 24, further comprising the steps of:

decoding a repeat instruction flag bit, said repeat instruction flag bit indicating that said prefetch instructions are to be placed into said buffer;

receiving a signal in said control unit, said signal indicating that said repeat instruction flag bit has been decoded;

re-initializing said program counter to said starting address; and re-setting said select input flag bit to said first value.

* * * * *

UNITED STATES PATENT AND TRADEMARK OFFICE
CERTIFICATE OF CORRECTION

| | | |
|---|---|---|
| PATENT NO. | : 6,684,319 B1 | Page 1 of 1 |
| APPLICATION NO. | : 09/608233 | |
| DATED | : January 27, 2004 | |
| INVENTOR(S) | : Mohamed et al. | |

It is certified that error appears in the above-identified patent and that said Letters Patent is hereby corrected as shown below:

In the claims, column 8, line 51, reading "transmitting a signal to said control unit said signal" should read -- transmitting a signal to said control unit, said signal --.

Signed and Sealed this

Seventeenth Day of October, 2006

JON W. DUDAS
*Director of the United States Patent and Trademark Office*